United States Patent [19]

Marze

[11] Patent Number: 4,545,910

[45] Date of Patent: Oct. 8, 1985

[54] SEMI-PERMEABLE MEMBRANES

[75] Inventor: Xavier Marze, Lyons, France

[73] Assignee: Hospal Industrie, Lyons, France

[21] Appl. No.: 212,829

[22] Filed: Dec. 4, 1980

Related U.S. Application Data

[63] Continuation of Ser. No. 10,548, Feb. 8, 1979, abandoned, which is a continuation of Ser. No. 872,911, Jan. 27, 1978, abandoned, which is a continuation of Ser. No. 492,217, Jul. 26, 1974, abandoned, which is a continuation-in-part of Ser. No. 178,400, Sep. 7, 1971, abandoned.

[30] Foreign Application Priority Data

Sep. 9, 1970 [FR] France ................. 70 32762

[51] Int. Cl.[4] .............. B01D 31/00; B01D 13/00
[52] U.S. Cl. ................. 210/651; 210/321.3; 210/500.2
[58] Field of Search .......... 210/651, 654, 321.1, 210/500.2, 321.3; 521/27

[56] References Cited

U.S. PATENT DOCUMENTS

| | | | |
|---|---|---|---|
| 3,129,273 | 4/1964 | Lowes, Jr. | 260/29.6 AH X |
| 3,247,133 | 4/1966 | Chen | 521/27 |
| 3,376,168 | 4/1968 | Horowitz | 521/27 X |
| 3,592,672 | 7/1971 | Rowley et al. | 210/500 M X |
| 3,615,024 | 10/1971 | Michaels | 210/500.2 X |
| 3,616,930 | 11/1971 | Muir | 210/321.3 X |
| 3,647,086 | 3/1972 | Mizutahi et al. | 210/500 M |
| 3,648,754 | 3/1972 | Sephton | 210/321 R |
| 3,723,306 | 3/1973 | Bridgeford | 210/22 |
| 3,750,735 | 8/1973 | Chiang et al. | 210/23 H X |

OTHER PUBLICATIONS

Trans. Amer. Soc. Artif. Int. Organs, vol. XII, 1966, pp. 44–52.
2nd Annual Contractor's Conference, 1/22–24/69, Bethesda, Md., pp. 69 & 70.

*Primary Examiner*—Frank Spear
*Attorney, Agent, or Firm*—Gerald D. Sharkin; Robert S. Honor; Walter F. Jewell

[57] ABSTRACT

A semi-permeable membrane which comprises either
 (i) a copolymer of acrylonitrile and at least one ionic or ionizable monomer, or
 (ii) a copolymer of acrylonitrile, at least one ionic or ionizable monomer, and at least one non-ionic and non-ionizable monomer, or
 (iii) a mixture of at least two copolymers as defined under (i) and/or (ii), or
 (iv) a mixture of at least one copolymer as defined under (i) and/or (ii), and at least one copolymer of acrylonitrile and at least one non-ionic and non-ionizable monomer, the ionic or ionizable monomer units representing from 1 to 80 mole % of the monomer units in one of said copolymers, and representing from 1 to 50 mole % of the monomer units in the membrane, said membrane having a degree of salt rejection of less than 1% and a permeability to water of more than 100 liters/day.m$^2$ at a relative pressure of 2 bars is provided having excellent properties for use in ultrafiltration and dialysis. A process for preparing a semi-permeable membrane is also provided which comprises treating a film containing at least one copolymer of acrylonitrile and an ionic or ionizable monomer, with water or an aqueous non-solvent mixture at a temperature between 60° and 250° C.

49 Claims, No Drawings

SEMI-PERMEABLE MEMBRANES

This is a continuation of application Ser. No. 10,548, filed Feb. 8, 1979, which in turn is a continuation of application Ser. No. 872 911, filed Jan. 27, 1978, which in turn is continuation of application Ser. No. 492,217, filed July 26, 1974, which in turn is a continuation-in-part of Ser. No. 178,400 filed Sept. 7, 1971, all now abandoned.

The present invention relates to the field of semi-permeable membranes which are particularly suitable for use in fractionation.

Certain membranes have ultra-filtration properties; these are membranes which can, on the one hand, allow small molecules, especially solvent molecules, to pass through them, whilst, on the other hand, retaining larger molecules, the molecular weight limit for distinguishing filtrable units from non-filtrable units being above about 500. The term "ultra-filtration" is used herein to describe a filtration in which the molecular weight limit which distinguishes the filtrable elements from the non-filtrable elements is above about 500.

The term "degree of salt rejection" of a membrane (expressed as a percentage) is defined herein as the number $$100 \times \left[1 - \frac{\text{NaCl concentration of a solution after permeation}}{\text{NaCl concentration of the solution subjected to permeation}}\right]$$

The degree of rejection for macromolecules in solution can be defined similarly.

The term "permeability to water" of a membrane under a given relative pressure is used herein to denote the flow of water across a membrane one face of which is in contact with water, the difference in pressure across the membrane being equal to the given relative pressure; the permeability is usually expressed either in liters/day.m$^2$ or in kg/day.m$^2$.

The present invention relates, primarily, to new membranes. According to the present invention, there is provided a semi-permeable membrane which comprises either:

(1) a copolymer of acrylonitrile and at least one ionic or ionisable monomer, or (ii) a copolymer of acrylonitrile, at least one ionic or ionisable monomer, and at least one non-ionic and non-ionisable monomer, or (iii) a mixture of at least two copolymers as defined under (i) and/or (ii), or (iv) a mixture of at least one copolymer as defined under (i) and/or (ii), and at least one copolymer of acrylonitrile and at least one non-ionic and non-ionisable monomer, the ionic or ionisable monomer units representing from 1 to 80 mole % of the monomer units in one of said copolymers, and representing from 1 to 50 mole % of the monomer units, in the membrane, said membrane having a degree of salt rejection (as hereinbefore defined) of less than 1% and a permeability to water (as hereinbefore defined) of more than 100 liters/day.m$^2$ at a relative pressure of 2 bars.

The ionic monomer contact is preferably between 2 and 15 mole % of all the monomers in the membrane. The thickness of the membranes of this invention is generally less than 300 microns, preferably less than 100 microns, but it is usually greater than 0.5 micron.

The ionic or ionisable monomers (hereafter referred to as the "ionic monomers") from which the copolymers are derived are generally olefinically unsaturated monomers containing at least one functional group, such as an optionally salified sulphonic acid or phosphonic acid group, or a quaternary ammonium group. More particularly, they are monomers of formula

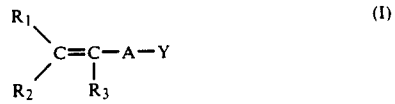

in which

Y represents a functional group such as those quoted above;

each of $R_1$, $R_2$ and $R_3$, which may be identical or different, represents a hydrogen atom or an alkyl radical of 1 to 4 carbon atoms; preferably, $R_1$ and $R_2$ are both hydrogen atoms and $R_3$ is either a hydrogen atom or a methyl radical;

A represents either (a) a divalent purely hydrocarbon group the free valencies of which are carried by a purely aliphatic saturated or unsaturated, straight or branched chain, or are carried by an unsubstituted aromatic nucleus or are carried by a mixed monoaromatic-monoaliphatic chain, one of the free valencies being carried by an aliphatic carbon atom and the other free valency being carried by an aromatic carbon atom, or (b) a divalent chain consisting of aliphatic and/or aromatic hydrocarbon groups bonded to one another by an oxygen or sulphur atom or by a carbonyloxy or 1-oxo-2-aza-ethylene group, the free valencies being carried by aliphatic and/or aromatic carbon atoms, or (c) a —O—A'— or —S—A'— group wherein A' represents a group such as defined above under (a) or (b) for A, or (d) a divalent group as defined under (a), (b) or (c), in which one or more of the carbon atoms additionally carry substituents, for example hydroxyl groups or halogen atoms, or (e) a simple valency bond.

The total number of carbon atoms in A is usually less than 12. The acid groups of the ionic comonomers of the acrylonitrile can be in the form of various salts, but are preferably in the form of sodium, potassium or ammonium salts.

Amongst the quaternary ammonium groups which Y can represent, the following may be mentioned: radicals of formulae

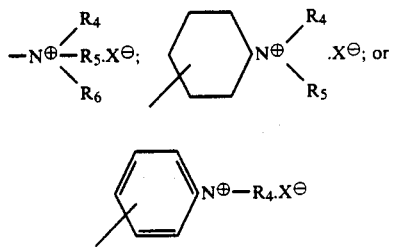

in which:

$X^\ominus$ is an inorganic or organic anion the precise nature of which is not a characteristic of the invention, and which can be replaced by a different anion in accordance with the conventional ion exchange techniques; typical anions include the halides, nitrates, sulphates, sulphites, phosphates and sulphonates;

each of $R_4$, $R_5$ and $R_6$, which may be the same or different, represents a monovalent or polyvalent organic radical, and at least two of these radials can optionally together form a single divalent or trivalent radical, the atoms carrying the free valencies being carbon atoms; if the radicals $R_4$, $R_5$ and $R_6$ are polyvalent, the free radicals may be attached either to one and the same nitrogen atom or to different nitrogen atoms belonging to different macromolecular chains, with one and the same nitrogen atom carrying only single bonds, or at most one intracyclic double bond; preferred monovalent radicals $R_4$, $R_5$ and $R_6$ include optionally substituted alkyl radicals with 1 to 4 carbon atoms, for example methyl, ethyl, propyl, butyl and β-hydroxyethyl radicals; preferred polyvalent radicals include alkylene, alkenylene, alkanetriyl, alkenetriyl, alkylidene and alkenylidene radicals, and homologous radicals containing chain or substituent hetero-atoms such as O, N or S, or possessing alkano or alkeno bridges; amongst these divalent or trivalent radicals, radicals with 4 to 10 carbon atoms are preferably used.

Reference to "copolymer of acrylonitrile and of monomers with quaternary ammonium groups" is not intended to imply anything as regards the process of preparation of the copolymers; in particular it is not intended to imply that these copolymers are actually prepared from acrylonitrile and monomers with quaternary ammonium groups; they can equally well be prepared from acrylonitrile and monomers with tertiary amine groups, with subsequent quaternisation of the non-ionic copolymer obtained.

Suitable ionic monomers from which the copolymers with acrylonitrile may be obtained include (a) monomers containing sulphonic acid groups: vinylsulphonic, allylsulphonic, methallylsulphonic and styrenesulphonic acids; methylstyrenesulphonic, dimethylstyrenesulphonic and ethylstyrenesulphonic acids; vinylbenzenesulphonic acids, allyloxybenzenesulphonic and methallyloxybenzenesulphonic acids; allyloxy ethylsulphonic and methallyloxyethylsulphonic acids, as well as the salts of these various acids.

(b) monomers with phosphonic groups: vinylphosphonic acid, vinylbenzenephosphonic acid and their salts.

(c) monomers with quaternary ammonium groups; 2-vinyl- and 4-vinyl-N-alkyl-pyridinium salts with an alkyl radical having 1 to 4 carbon atoms; N-allyl- and N-methallyl-pyridinium salts, N-allyl- and N-methallyl-trialkylammonium salts, the alkyl radicals containing, in total less than 13 carbon atoms; vinyl-N-alkyl-picolinium salts with an alkyl radical having 1 to 4 carbon atoms, especially 5-vinyl-2-methyl-N-alkyl-pyridinium salt; vinyl-N-alkyllutidinium salts with an alkyl radical having 1 to 4 carbon atoms, especially vinyl-N-alkyl-2,4-dimethylpyridinium salt; o- and p-(vinylphenyl)trialkylammonium salts with the alkyl radicals having a total of less than 13 carbon atoms; vinyl-N-alkylmorpholinium salts with an alkyl radical having 1 to 4 carbon atoms; 2-(trialkylammonium)-ethyl acrylates and methacrylates, the alkyl radicals containing, in total, less than 13 carbon atoms; and acrylamides and methacrylamides homologous to the abovementioned acrylates and methacrylates.

The copolymers of acrylonitrile and of ionic monomers used in the membranes of this invention can, as mentioned above, also contain units derived from other olefinically unsaturated monomers, capable of copolymerising with acrylonitrile; suitable such monomers include ethylenic hydrocarbon monomers such as butadiene and styrene; vinyl and vinylidene chlorides; vinyl ethers; unsaturated ketones such as butenone, phenyl-vinyl-ketone and methyl-isopropenyl-ketone; vinyl esters of carboxylic acids, for example of formates, acetates, propionates, butyrates and benzoates; alkyl, cycloalkyl and aryl esters of unsaturated monocarboxylic or polycarboxylic aliphatic acids, such as methyl, ethyl, propyl, butyl or β-hydroxyethyl acrylates, methacrylates, maleates, fumarates, citraconates, mesaconates, itaconates and aconitates; acrylamide and methacrylamide and their N-substituted derivatives.

Furthermore, the copolymers of acrylonitrile and an ionic monomer can optionally be crosslinked, for example by divinyl derivatives.

If the membranes according to the invention consist essentially of mixtures of at least two copolymers of acrylonitrile, these mixtures can consist either of several copolymers of acrylonitrile and ionic monomers, or of at least one copolymer of acrylonitrile and an ionic monomer, on the one hand, and at least one copolymer of acrylonitrile and a non-ionic monomer, on the other. In these various types of mixture, the copolymer or copolymers of acrylonitrile and an ionic monomer can contain up to 80 mol % of ionic monomer, the total content of ionic monomer in the mixture however being less than 50 mol %, as indicated above. In these mixtures, the non-ionic monomers which can be used are the same as those which can be used as comonomers with acrylonitrile and the ionic monomers.

The present invention also provides a process for the preparation of semi-permeable membranes, in particular of membranes such as those defined above. This process comprises treating a homogeneous film containing at least one copolymer of acrylonitrile and an ionic monomer, with water or with an aqueous non-solvent mixture at a temperature of between 60° and 250° C., preferably between 80° and 190° C. In the subsequent description, the use of the word "film" will be restricted to liquid or solid films which have not yet undergone the treatment, and the term "membrane" will be restricted to the films of high permeability which have been treated according to the process of this invention.

The homogeneous films containing at least one copolymer of acrylonitrile and an ionic monomer, which can be used as the starting material, have the same chemical composition as the membranes according to the invention. They are well-known products which have a degree of rejection of salt which is not zero and possess a low permeability to water even under high pressure; they can contain residual amounts of solvent but can generally be handled without the aid of a support. They are generally prepared by simple casting of a solution of the copolymer or a solution of a mixture of copolymers on a rigid support and evaporating the solvent. These processes can optionally be followed by crosslinking for example with dihalogenated reagents if the acrylonitrile polymer contains amine groups, or with divinyl compounds.

If a reinforced membrane is required, the starting film should itself be reinforced, and this can easily be achieved by performing the casting operation or a reinforcing support, for example a fabric or net.

The copolymers of acrylonitrile and an ionic monomer used to form the films to be treated with hot water generally have a specific viscosity (measured at 25° C., in a 2 g/l solution in dimethylformamide) of between 0.1 and 3, preferably between 0.5 and 1.5. (These values are for the films before crosslinking if crosslinking is carried out, and before mixing if mixtures are subsequently prepared).

The following documents may be referred to for further details of the preparation of copolymers of acrylonitrile and an ionic or non-ionic monomer, and of films comprising them: British Pat. No. 823,345, French Pat. Nos. 1,446,001 and 1,267,240, U.S. Pat. Nos. 2,601,251, 2,617,781, 2,662,875, 2,691,640, 2,837,500, 2,840,550, 2,883,370 and 2,941,969, Fresenius, Z.Anal. Chem. 238 432–41 (1968) Houben-Weyl, Methoden der Organischen Chemie (Methods of Organic Chemistry), 14/1 p.998–1009, and Encyclopedia of Polymer Science and Technology 1 374–444 (1964; Interscience Publishers). It is to be appreciated, though, that the preparation is essentially conventional.

The temperature of the water or aqueous mixture used for the treatment in the process of this invention is between 60° and 250° C., preferably between 80° and 190° C. The highest temperatures are generally used to treat films having a low proportion of ionic monomer units; conversely, the lowest temperatures are used to treat films having a high proportion of ionic monomer units. Thus, for films containing less than 5 mol % of units corresponding to a copolymerised ionic monomer, the treatment with water is preferably carried out above 105° C., and below 105° C. where more than 5 mol % of such units is present.

The water or aqueous mixtures used in the process of the invention can be in the vapour phase, but are preferably used in the liquid phase. Of course treatment above 100° C. may require working under pressure if it is desired to use water or a liquid aqueous mixture, but apart from this, the pressure is not a critical factor in the preparation of the membranes of this invention.

The water content in the aqueous mixtures is usually above 50% by weight, preferably above 90%. The water can be mixed with organic solvents or with inorganic or organic electrolytes; preferably, chemically neutral, especially non-basic, mixtures are used, so as not to cause a chemical attack on the acrylonitrile copolymer. A pH of 6 to 8 is generally suitable.

The treatment of the film with water or the aqueous mixture can usually be carried out by simple immersion in an aqueous treatment bath. The process can be carried out continuously or discontinuously and the bath can be either static relative to the film or it can be stirred or circulated. If the process is carried out continuously, it is advantageous to pass the film continuously through the treatment bath. The duration of the treatment should usually be from 5 seconds to 2 hours, but there is no critical upper limit. In practice, no significant change in the properties of the membranes is observed if the treatment is continued for more than 24 hours.

In an advantageous embodiment of the process of this invention after having reached the maximum temperature, the membrane, immersed in its treatment bath, is allowed to return to ambient temperature; this results in membranes having a better performance.

The heat treatment can be simultaneously accompanied by a monoaxial or biaxial stretching. The purpose of this stretching is, generally, to enable one to effect the heat treatment at a lower temperature whilst still obtaining membranes having a good performance; it furthermore makes it possible to obtain an improvement in the mechanical properties; the degree of linear stretching is generally between 20% and 100%, preferably between 50 and 500%. Of course the heat treatment and the stretching can be carried out in one step or in several stages. Again, better dimensional stability of the stretched membranes can generally be achieved by carrying out a relaxation by leaving the membrane, not under stress, in an aqueous bath at a temperature which is preferably below that of the heat treatment.

Of course, the treatment according to this invention does not affect the symmetry of the film so that the membrane, like the film, is symmetrical and can be used on either side.

The membranes of this invention and especially the membranes prepared as described above, are advantageously stored wet; they can also be stored dry if they are impregnated with hygroscopic plasticiser, for example by temporarily immersing them in glycerine or a water/glycerine mixture.

The present invention also provides an apparatus for the fractionation of liquid mixtures. This apparatus comprises ($\alpha$) a first compartment designed to obtain the liquid mixture to be fractionated, ($\beta$) optionally, means of feeding the liquid mixture into the first compartment and means for withdrawing it therefrom (especially in the case of continuous operation), ($\gamma$) a semi-permeable membrane of the present invention forming one of the walls of the first compartment, ($\delta$) a second compartment, one of the walls of which is the semi-permeable membrane, and which is designed to contain a liquid at least a part of which has passed through the semi-permeable membrane, and ($\epsilon$) optionally, means for withdrawing the liquid contained in the second compartment (especially in the case of continuous operation).

The liquid mixtures which can be fractionated are essentially aqueous liquid solutions, suspensions or emulsions; the substances dissolved in these solutions, suspensions or emulsions can be ionic substances such as salts, acids or bases, or non-ionic substances such as low molecular weight solutes, macromolecules and solvents.

The term "fractionation" as used herein is intended to cover operations such as concentration, refining and purification.

The membranes of this invention render the apparatus particularly useful in ultra-filtration and in dialysis, because of their low resistance to the passage of low molecular weight material, especially water, and their ability to retain higher molecular weight material. The fractionation apparatuses of this invention divide themselves into two groups, ultra-filtration apparatuses, on the one hand, and dialysis apparatuses, on the other.

In the ultra-filtration apparatus, the permeate (or ultra-filtrate) consists essentially of a solvent (for example water) and, optionally, of other low molecular weight compounds such as ionic solutes, co-solvents, neutral solutes, small organic molecules and oligomers, the molecular weight limit between compounds which can be ultra-filtered and those which cannot be ultra-filtered being generally above 500. Apart from the constituents $\alpha$ to $\epsilon$ mentioned above, the ultra-filtration apparatus of this invention may comprise means which make it possible to establish, in the first compartment, a pressure above that prevailing in the second compartment; this may be provided by having a superatmospheric pressure in the first compartment or a reduced pressure in the second. Other features of the ultra-filtration apparatus include:

A pressure-resistant porous support or a network or grooved support which enables the semi-permeable membrane to withstand pressures better;

means which allows the liquid to be ultra-filtered to be circulated in the first compartment; and means which provides turbulence or liquid circulation in the first compartment close to the membrane in order to avoid local over-concentration phenomena developing.

In the dialysis apparatus, the migration of the permeate across the membrane takes place under the influence of a difference in concentration between the two compartments; the permeate (or dialysate) essentially consists of low molecular weight compounds (such as salts or ionic solutes, possibly with a little solvent, for example water). Apart from the components α and ε mentioned above, the dialysis apparatus of this invention may comprise means of introducing to the second compartment, a liquid called the dialysis bath.

Other features which may be included in the dialysis apparatus are, for example:

means which allows the liquid to be dialysed to be circulated in the first compartment; and means which allows the dialysis bath to be circulated in the second compartment.

Of course the preceding discussion relates to oversimplified ultrafiltration and dialysis apparatuses; more complex apparatuses derived therefrom can naturally be used, for example apparatuses consisting of a plurality of unit apparatuses, such as apparatuses of the filter-press type. Since the characteristic of the fractionation apparatus of the invention resides in the nature of the membrane used, the factors involved in these apparatuses are essentially the same as those of known apparatus. In particular, it is possible to use apparatuses which employ semi-permeable membranes in the form of plates, cones, tubes, spirals and strips.

Further details of the features of ultra-filtration apparatuses, can be found in the following documents: French Pat. Nos. 1,252,995, 1,512,555, 1,583,221, 1,429,635 and 2,001,558, U.S. Pat. Nos. 3,341,024 and 3,131,143, Canadian Pat. No. 819,509 and German Pat. No. 2,119,906. Further details of the features of dialysis apparatus, can be found in the following documents: Ind. Eng. Chem. 54 (6) 20-8 (1962), French Pat. Nos. 1,527,944, 1,528,430, 1,397,297, 1,464,722, 1,518,607 and 1,597,874, R. N. RICKLES, "Membranes technology and Economics" (1967 edition), Kirk-Othmer, Encyclopaedia of Chemical Technology 5, 1-20 (1st edition) and 7, 1-21 (2nd edition), U.S. Pat. No. 3,186,917 and German Pat. Nos. 1,245,322 and 1,921,201.

The dialysis apparatus of the present invention can be used as, for example, artificial kidneys which permit purification of the blood and especially the removal of urea, as well as apparatus for the elimination of ascites liquid.

The membranes of this invention can, of course, also be used for dialysis without the aid of particular apparatus; to do this, the solution to be dialysed may be enclosed in a sealed pouch made from the dialysis membrane, and this pouch immersed in a dialysis bath, i.e. a dilute solution of low molecular weight material.

There are numerous practical applications involving ultrafiltration and dialysis with the membranes and apparatuses of this invention. Such applications include the concentration of foodstuff liquids such as milk, whey, buttermilk, fruit juices and meat juices; the concentration of macromolecular products used in the pharmaceutical industry, such as solutions or suspensions of antibiotics, viruses, bacteria, proteins and enzymes; the concentration and/or the purification of latex and of emulsions of natural or synthetic polymers; the separation of aminoacids, steroids, sugars, hormones and alkaloids from mixtures with compounds of higher molecular weight; the purification of blood, plasma or serum; the purification of effluents; and the sterilisation of water.

The following examples further illustrate the present invention:

EXAMPLES 1 TO 16

A series of membranes was produced observing the following general procedure (the particular conditions are indicated in Table I):

A copolymer of acrylonitrile, an ionic monomer and, optionally, a third monomer was dissolved in dimethylformamide (DMF) so as to obtain the specified concentration.

This solution was cast onto a glass plate so as to obtain a liquid film 0.5 mm thick, which was thereafter dried in a ventilated oven at 60° C. for the period indicated; the dried film was detached from its support and treated with hot water; to carry out this treatment, the dry film was immersed in a vessel containing water and the whole was heated to the maximum temperature indicated, and this temperature was maintained for 10 minutes (in the case of the Examples where this temperature exceeds 100° C., the vessel containing the water and the film was closed and kept under orthogenic pressure); thereafter the heating was stopped and the vessel allowed to cool to ambient temperature whilst leaving the membrane immersed in the water in the vessel.

All the membranes thus prepared showed a zero degree of salt rejection. Their permeability to water was measured as follows:

12 $cm^2$ of membrane were placed on a porous sintered metal plate; water was placed in contact with the free face of the membrane and a pressure of 2 bars applied thereto. The flow of water across the membrane was measured; this flow, expressed in liters/$m^2$.day, is the permeability of the membrane to water.

Specific information relating to certain examples:

EXAMPLE 13

The polymer used was a mixture of two copolymers in a weight ratio of 43/57. The first was a copolymer of acrylonitrile and sodium methallylsulphonate in a weight ratio of 82/18; the second was a copolymer of acrylonitrile and styrene in a weight ratio of 85/15.

EXAMPLE 14

The polymer used was a mixture of equal weights of two copolymers; one was a copolymer of acrylonitrile and sodium methallylsulphonate in a weight ratio of 82/18, the other was a copolymer of acrylonitrile and butyl acrylate in a weight ratio of 85/15.

EXAMPLE 15

The polymer mixture used only differs from that of Example 14 in that the butyl acrylate was replaced by an equal weight of vinyl benzoate.

EXAMPLES 17 TO 37

The membranes prepared in Example 1 to 16 were used firstly in ultrafiltration processes (A) and secondly in dialysis processes (B).

(A) 12 cm² of membrane were placed on a porous sintered metal plate; an aqueous solution of a specified macromolecular product was placed in contact with the free face of the membrane and a pressure of 2 bars applied thereto; the flow of ultrafiltrate in liters/day.m², as well as the degree of rejection expressed as a percentage, namely $$100 \times \left[1 - \frac{\text{concentration of macromolecules in the ultrafiltrate}}{\text{concentration of macromolecules in the initial solution}}\right]$$

was measured.

Tables II and III give details of the solution subjected to ultrafiltration, as well as the flow of ultrafiltrate and the degree of rejection of the macromolecule.

(B) A dialysis cell was divided into two compartments by a membrane having 10 cm² surface area. 100 cm³ of an aqueous solution containing 9 g/l of NaCl, 1 g/l of thiourea and 10 g/l of cattle albumen (molecular weight: approx. 70,000) flowed in closed circuit through the first compartment: this solution, hereafter referred to as "synthetic blood", circulated in the compartment at a flow rate of 1 l/hour. 100 cm³ of an aqueous solution containing 10 g of NaCl/l flowed in closed circuit through the second compartment, this solution being hereafter called the "dialysis bath"; it circulated in the compartment at a flow rate of 0.9 l/hour.

The rate of dialysis was measured by determining the time in minutes taken for the concentration of thiourea in the dialysis bath to reach 0.1 g/l; this time is indicated for certain membranes in Table (II).

TABLE I

| Nature of polymer | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Molar percentages of comonomers (made up to 100% with acrylonitrile) | | | | | | | | | | | | | | | | |
| Sodium methallylsulphonate | 2.094 | 3.32 | 3.71 | 5.74 | 6.35 | 7.16 | | 2.60 | 3.33 | | | 2.58 | 3.36 | 3.90 | 3.91 | |
| Potassium vinyloxybenzenesulphonate | | | | | | | 3.40 | | | | | | | | | 5.08 |
| Sodium vinylsulphonate | | | | | | | | | | 4.28 | 6.21 | | | | | |
| N—methyl-4-vinylpyridinium sulphate | | | | | | | | 5.79 | | | | | | | | |
| Methyl methacrylate | | | | | | | | | | | | | 3.45 | | | |
| Butyl acrylate | | | | | | | | | | | | | | 2.99 | | |
| Vinyl benzoate | | | | | | | | | 4.51 | | | | | | | |
| Vinylidene chloride | | | | | | | | | | | | 7.97 | | | | |
| Acrylamide | | | | | | | | | | | 4.75 | | | | | |
| Styrene | | | | | | | | | | | | | | | | |
| Specific viscostiy (measured at 25° C., at 2 g/l in DMF) | 0.812 | 1.039 | 0.743 | 0.980 | 1.026 | 0.962 | | 1.192 | 0.62 | | 0.374 | 0.926 | | | | 0.63 |
| Concentration of the copolymer solution (% by weight) | 9 | 8 | 8.5 | 10 | 10 | 10 | 10 | 10 | 10 | 10 | 10 | 10 | 8 | 10 | 10 | 7 |
| Duration of drying in the oven, in hours | 42 | 67 | 42 | 45 | 52 | 24 | 24 | 48 | 48 | 40 | 70 | 72 | 72 | 24 | 24 | 21 |
| Maximum temperature of the treatment water, in °C. | 180 | 147 | 146 | 113 | 104 | 92 | 146 | 140 | 140 | 146 | 146 | 147 | 145 | 145 | 145 | 120 |
| Thickness of the membrane, in microns | 45 | 65 | 55 | 50 | 80 | 45 | 60 | 55 | 45 | 60 | 55 | 90 | 80 | 70 | 70 | 30 |
| Permeability to water under 2 bars pressure, in l/day · m² | 230 | 350 | 520 | 650 | 300 | 480 | 800 | 600 | 800 | 570 | 8000 | 2900 | 1800 | 1500 | 2600 | 360 |
| Tensile strength of the membrane in kg/cm² (measured at 23° C., whilst wet) | | 130 | | | | | | 130 | 100 | | | | 90 | | | |
| Tensile elongation at break, in % | | 48 | | | | | | 31 | 41 | | | | 41 | | | |

TABLE II

| | Example | | | | | | |
|---|---|---|---|---|---|---|---|
| | 17 | 18 | 19 | 20 | 21 | 22 | 23 |
| Membrane used, prepared according to Example | 2 | 3 | 3 | 3 | 4 | 5 | 6 |
| Ultrafiltration | | | | | | | |
| Nature of the initial solution subjected to ultrafiltration | | | | | | | |

TABLE II-continued

| Concentration of NaCl in g/l | 9 | 9 | 5.85 | 0 | 9 | 9 | 9 |
|---|---|---|---|---|---|---|---|
| Nature of the macromolecule | cattle albumen | cattle albumen | pepsin | dextran | cattle albumen | cattle albumen | cattle albumen |
| Average molecular weight of the macromolecule | 7000 | 7000 | 3600 | 1000 | 7000 | 7000 | 7000 |
| Concentration of macromolecule in g/l | 10 | 10 | 0.5 | 4 | 10 | 10 | 10 |
| Results obtained | | | | | | | |
| Flow of ultrafiltrate in liters/day · m² | 350 | 520 | 520 | 520 | 720 | 300 | 480 |
| Degree of rejection in % | 100 | 100 | 70 | 50 | 98 | 98.5 | 100 |
| Dialysis | | | | | | | |
| Rate of dialysis in minutes | | 52 | | | | | |

| | Example | | | | | | |
|---|---|---|---|---|---|---|---|
| | 24 | 25 | 26 | 27 | 28 | 29 | 30 |
| Membrane used, prepared according to Example | 6 | 6 | 7 | 8 | 8 | 8 | 9 |
| Ultrafiltration | | | | | | | |
| Nature of the initial solution subjected to ultrafiltration | | | | | | | |
| Concentration of NaCl in g/l | 5.85 | 0 | 9 | 9 | 0 | 0 | 9 |
| Nature of the macromolecule | lysozyme | dextran | cattle albumen | cattle albumen | dextran | dextran | cattle albumen |
| Average molecular weight of the macromolecule | 15000 | 1000 | 7000 | 7000 | 4000 | 1000 | 7000 |
| Concentration of macromolecule in g/l | 0.5 | 4 | 10 | 10 | 4 | 4 | 1 |
| Results obtained | | | | | | | |
| Flow of ultrafiltrate in liters/day · m² | 480 | 480 | 760 | 600 | 600 | 600 | 700 |
| Degree of rejection in % | 100 | 40 | 100 | 100 | 50 | 28 | 100 |
| Dialysis | | | | | | | |
| Rate of dialysis in minutes | | | | 58 | | | |

TABLE III

| | Example | | | | | | |
|---|---|---|---|---|---|---|---|
| | 31 | 32 | 33 | 34 | 35 | 36 | 37 |
| Membrane used, prepared according to Example | 10 | 11 | 12 | 13 | 14 | 15 | 16 |
| Ultrafiltration | | | | | | | |
| Nature of the initial solution subjected to ultrafiltration | | | | | | | |
| Concentration of NaCl in g/l | 9 | 9 | 9 | 9 | 9 | 9 | 9 |
| Nature of the macromolecule | cattle albumen | cattle albumen | cattle albumen | cattle albumen | cattle albumen | cattle albumen | cattle albumen |
| Average molecular weight of the macromolecule | 70,000 | 70,000 | 70,000 | 70,000 | 70,000 | 70,000 | 70,000 |
| Concentration of macromolecule in g/l | 10 | 10 | 10 | 10 | 10 | 10 | 10 |
| Results obtained | | | | | | | |
| Flow of ultrafiltrate in liters/day · m² | 480 | 720 | 1,000 | 1,000 | 1,000 | 1,330 | 360 |
| Degree of rejection in % | 99 | 90 | 90 | 96 | 93 | 90 | 100 |

EXAMPLE 38

Milk was concentrated in an ultrafiltration cell with the two compartments separated by a membrane prepared as in Example 3, having a useful surface area of 465 cm². A relative pressure (relative to the second compartment) of 3 bars prevailed in the first compartment. The membrane was supported by a rigid plate of sintered polyethylene. Milk was circulated between this compartment and a storage reservoir; the rate of circulation at the membrane was 85 cm/second and the total weight of milk in circulation was initially 8.015 kg.

The whole operation, which was carried out at a temperature of +4° C., was continued for 11 hours 30 minutes. 4.007 kg of ultrafiltrate containing essentially, water, inorganic salts, lactose, and non-protein nitrogen-containing components had been collected in the second compartment; this amount of ultrafiltrate corresponds to a flow rate of 180 kg/day.m²; the milk obtained in the first compartment had thus been concentrated two-fold.

EXAMPLE 39

Example 38 was repeated with the following modifications: the rate of circulation of the milk in the first compartment was 1 m/second, the temperature was +45° C., and the relative pressure between the two compartments was 6 bars.

After 11 hours 30 minutes, 6.835 kg of ultrafiltrate had been collected, corresponding to a flow rate of 307 kg/day.m²; the milk obtained in the first compartment had been concentrated about seven-fold.

EXAMPLE 40

The dialysis experiment of Example 18 was repeated, replacing the so-called "synthetic blood" solution by cattle blood to which was added 1 g/l of thiourea as well as 25% by volume (the percentage being expressed relative to the blood) of a solution consisting of: 1.66 g of citric acid, 0.6 g of sodium hydroxide, 3 g of glucose and water sufficient to give 100 cm³ of solution.

The rate of dialysis (expressed in minutes, in accordance with the definition given above) was 91 minutes.

EXAMPLE 41

The following were introduced into a glass reactor: 330 g of a copolymer of acrylonitrile and sodium methallylsulphonate in the relative weight ratio of 91/9; the specific viscosity of the copolymer (measured at 25° C. in a 2 g/l solution in DMF) being 1; and 1600 cm$^3$ of DMF.

The mixture was stirred for 1 hour at 20° C. and then for 4 hours at 90° C. The gases which may have been dissolved were then removed by placing the reactor under a pressure of 100 mm/Hg for 30 minutes; the viscosity of the solution at 23° C. was about 200 poises.

This solution was continuously cast onto a 17 cm wide endless stainless steel belt circulating at a speed of 50 cm/minute; a 0.2 mm thick liquid film was thus desposited. The strip then passed into a 1.2 m long ventilated oven heated to 150° C. and was thereafter cooled to 20° C.; the film of acrylonitrile copolymer was moisturised by passing it over a fabric wetted with water and detached from the steel belt on which it was carried; this film then passed for 10 cm, through a bath of water at 90° C.; it issued therefrom at a speed of 140 cm/minute, corresponding to a degree of stretching of 180%. The stretched film then passed through a bath of water at 75° C. over 2 m, without being subjected to any tension whatsover; it issued from this bath at a speed of 100 cm/minute and then passed through a bath of glycerine (a mixture of water and glycerine in a weight ratio of 20/80) over 2 m, after which it was dried by passing between two rollers so as to drive off the excess glycerine.

A 30μ thick membrane was thus obtained; it had a permeability to water, under 2 bars, of 860 liters/day.m$^2$ and can be stored dry. Its degree of rejection was 100% for cattle albumen (molecular weight: 70,000) and for ovalbumin (molecular weight: 45,000); it was only 53% for dextran (molecular weight: 40,000).

EXAMPLES 42 TO 44

Example 41 is repeated, varying the degree of stretching. The following results were obtained:

|  | Example | | |
| --- | --- | --- | --- |
|  | 42 | 43 | 44 |
| Degree of stretching in % | 165 | 135 | 100 |
| Permeability to water under 2 bars (l/day · m$^2$) | 505 | 360 | 216 |
| Degree of rejection in % | | | |
| Cattle albumen, molecular weight: 70,000 | 100 | 100 | 100 |
| Ovalbumin, molecular weight: 45,000 | 100 | 100 | 100 |
| Pepsin, molecular weight: 36,000 | >90% | >90% | 100 |
| Lysozyme, molecular weight: 15,000 | >90% | >90% | 100 |
| Dextran, molecular weight: 40,000 | 74 | 78 | 85 |

EXAMPLE 45

A membrane was prepared as in Example 41, but with a degree of stretching of 185%.

This membrane was used for the ultrafiltration of river-water (the Rhone, downstream from the city of Lyon) containing fecal streptococci and "*Escherichia coli*" bacteria. The difference in pressure between the first and the second compartment of the ultrafiltration apparatus was 2 bars; in the first compartment the river-water circulated over the surface of the membrane at a speed of 115 cm/second; a permeate of potable water was collected at the rate of 1150 l/day.m$^2$; the potable character of this water was determined by bacteriological examinations, which showed the total absence of the bacteria mentioned above.

EXAMPLE 46

The membrane of Example 41 was used for the ultrafiltration of 3.5 liters of whey having a solids content of 65 g/l, a lactose concentration of 50 g/l and a protein concentration of 7.6 g/l.

The difference in pressure between the two ultrafiltration compartments was 2.5 bars; the speed of circulation of the whey in the first compartment was 50 cm/second at the surface of the membrane.

The ultrafiltration was continued until 3.250 l of ultrafiltrate had been obtained; the latter contained 59 g of solids/l, 50 g of lactose/l, and 0.7 g of proteins/l; the concentrate (withdrawn from the first compartment) had a solids content of 168 g/l, a lactose concentration of 48 g/l and a protein concentration of 96 g/l.

EXAMPLE 47

Example 46 was repeated, using the membrane of Example 44.

An ultrafiltrate having a solids content of 56 g/l and a lactose concentration of 50 g/l, and containing no proteins, was obtained; the concentrate had a solids content of 155 g/l, a lactose concentration of 58 g/l and a protein concentration of 93 g/l.

EXAMPLE 48

Human blood was ultrafiltered at 37° C. in an apparatus of the filter-press type with 8 compartments each possessing a membrane of 125 cm$^2$ surface area, prepared as in Example 41.

The blood circulated in the apparatus in contact with the membranes at a flow rate of 0.2 l/minute; the difference in pressure between the compartments on either side of the membrane was 300 mm/Hg. After running for 8 hours, the protein concentration of the ultrafiltrate was 0.27 g/l; the haematocrit reading of the circulating blood had not varied significantly; the flow rate of ultrafiltrate was 0.4 l/hour.

EXAMPLE 49

A membrane was prepared as in Example 41 with the following modifications. The reactor was charged initially with 71 grams of an acrylonitrile/sodium methallylsulphonate copolymer (weight ratio 91/9; having a specific viscosity of 0.979), 179 grams of an acrylonitrile/sodium methallylsulphonate copolymer (in a weight ratio of 89/11; having a specific viscosity of 1.123) and 1200 cm$^3$ of dimethyl formamide.

The drawing ratio was 186%.

A dialysis cell, maintained at 37° C., was separated into two compartments by 625 cm$^2$ of the membrane prepared above. In the first compartment of this cell human blood was circulated, in a closed circuit with a flow of 12.5 cm$^3$/mm; the total volume of blood in circulation was 1.1 liters and the blood contained 1.5 g/l of urea and 0.15 g/l of creatine. In the second compartment was circulated a dialysis bath having the same saline composition as the blood.

A reduction to a half the original concentration in the blood was observed after 1 hour 40 mins for the urea and after 2 hours 25 mins for the creatine.

EXAMPLE 50

An ascitic liquid containing 20 g/l of protein was removed from the peritoneum of a patient suffering from cirrhosis of the liver. This ascitic liquid was introduced to an ultrafiltration apparatus comprising eleven elementary cells arranged in series having a total membrane area of 1450 cm². prepared as in Example 49 but with a stretching ratio of 182%. The pressure differential across these membranes was 200 mm Hg (the excess pressure being on the side containing the ascitic liquid). The ascitic liquid passed through the membranes where it was concentrated by ultrafiltration and was then reinjected into a vein of the patient. A flow rate of 0.6 l/h was observed for the ultra filtrate while the ascitic liquid which has been concentrated was reinjected into the patient at a flow rate of 0.3 l/h.

I claim:

1. A semi-permeable membrane material for use in an apparatus adapted for dialysis and ultrafiltration of blood, having the following characteristics:
   (a) high ultrafiltration properties indicated by a permeability to water in an aqueous macromolecular (of a molecular weight greater than 500) solution of from 230 to 8000 l/day m² at a relative pressure of 2 bars;
   (b) a thickness of less than 100 microns and greater than 0.5 microns;
   (c) a degree of rejection of salt as defined by $$100 \times 1 - \frac{\text{NaCl concentration of a solution after permeation}}{\text{NaCl concentrarion of the solution subjected to permeation}}$$

of less than 1%;
   (d) a degree of rejection of macromolecules defined by $$100 \times 1 - \frac{\text{concentration of macromolecules of a solution after permeation}}{\text{concentration of macromolecules of the solution subjected to permeation}}$$

which is from 90% to 100% for cattle albumin of a molecular weight of 70,000, when an aqueous solution comprising 10 g/l of cattle albumin and 9 g/l of NaCl is subjected to a relative pressure of 2 bars;
   (e) a high hemodialysis rate as represented by a reduction to a half the original concentration in 1.1 liters of human blood being reached after at most 1 hour 40 mn for urea and at most 2 hours 25 mn for creatinine, said blood circulated in a closed circuit at a rate of 12.5 cm3/mn over 625 cm2 of membrane, circulated dialysis bath having the same saline composition as the blood.

2. In an apparatus adapted for dialysis and ultrafiltration of blood which comprises two compartments separated by a membrane, the improvement wherein the membrane is one of claim 45 which has been obtained by treating a film containing at least one copolymer of acrylonitrile and an ionic or ionisable olefinically unsaturated monomer by immersion in water or an aqueous non-solvent mixture at a temperature between 60° and 250° C.

3. Apparatus according to claim 2 which comprises means for circulating, or causing turbulence in, the blood to be dialyzed and ultrafiltered.

4. Ultra-filtration apparatus according to claim 2 which comprises means for establishing a pressure difference between the two compartments.

5. Ultra-filtration apparatus according to claim 4, which comprises a pressure-resistant porous support for the membrane.

6. Apparatus according to claim 2 which comprises means for continuously feeding to, and withdrawing from, the compartment designed to contain the blood to be dialyzed and ultrafiltered.

7. Dialysis apparatus according to claim 6, which comprises means for circulating dialysis liquid in the other compartment.

8. Apparatus according to claim 2 wherein the film consists essentially of either:
   (i) a copolymer of acrylonitrile and at least one ionic or ionisable olefinically unsaturated monomer, or
   (ii) a copolymer of acrylonitrile, at least one ionic or ionisable olefinically unsaturated monomer, and at least one non-ionic and non-ionisable olefinically unsaturated monomer, or
   (iii) a mixture of at least two copolymers as defined under (1) and/or (ii), or
   (iv) a mixture of at least one copolymer as defined under (1) and/or (ii), and at least one copolymer of acrylonitrile and at least on non-ionic and non-ionisable olefinically unsaturated monomer, the ionic or ionisable monomer units representing from 1 to 80% of the monomer units in one of said copolymers, and representing from 1 to 50% of the monomer units in the membrane.

9. Apparatus according to claim 8, wherein the ionic or ionisable monomer is one having the formula:

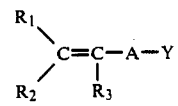

in which:
   r represents an optionally salified sulphonic acid or phosphonic acid group, or a quaternary ammonium group;
   each of $R_1$, $R_2$ and $R_3$, which may be identical or different, represents a hydrogen atom or an alkyl radical of 1 to 4 carbon atoms; and
   A represents:
   (a) a divalent purely hydrocarbon group, the free valencies of which are carried by a purely aliphatic saturated or unsaturated, straight or branched chain, or by an aromatic nucleus, or by a mixed chain, one of the free valencies being carried by an aliphatic carbon atom and the other free valency being carried by an aromatic carbon atom,
   or (b) a divalent chain consisting of aliphatic and/or aromatic hydrocarbon groups, bonded to one another by an oxygen or sulphur atom or by a carbonyloxy or 1-oxo-2-aza-ethylene group, the free valencies being carried by aliphatic and/or aromatic carbon atoms,
   or (c) a —O—A'— or —S—A'— group, wherein A' represents a group as defined under (a) or (b), or (d) a divalent group as defined under (a), (b) or (c) in which one or more of the carbon atoms are substituted, or (e) a valency bond.

10. Apparatus according to claim 9, wherein $R_1$ and $R_2$ represent hydrogen atoms and $R_3$ represents a hydrogen atom or a methyl radical.

11. Apparatus according to claim 10, wherein A contains less than 12 carbon atoms.

12. Apparatus according to claim 8, wherein the ionic or ionisable monomer is vinylsulphonic, vinyloxybenzenesulphonic or methallylsulphonic acid or a salt thereof or a E-methylvinyl-pyridinium salt.

13. Apparatus according to claim 8, wherein the non-ionic and non-ionisable monomer is vinylidene chloride, acrylamide or styrene.

14. Apparatus according to claim 2 wherein the ionic or ionisable monomer represents from 2 to 15 mole % of all the monomers in the membrane.

15. Apparatus according to claim 2 wherein the membrane is reinforced with a support.

16. Apparatus according to claim 2, wherein the temperature is between 80° and 190° C. and the film is immersed in water or a liquid aqueous non-solvent mixture.

17. Apparatus according to claim 1, wherein during the treatment the film is monoaxially or biaxially stretched between 20 and 1,000% measured linearly during said treatment.

18. Apparatus according to claim 17, wherein the film is stretched between 50 and 500%, measured linearly.

19. In a method of ultra-filtering and dialysing blood which comprises placing the blood in contact with a membrane, the improvement wherein the membrane is one of claim 1 which has been obtained by treating a film containing at least one copolymer of acrylonitrile and an ionic or ionisable olefinically unsaturated monomer by immersion in water or an aqueous non-solvent mixture at a temperature between 60° and 250° C.

20. A method according to claim 19 wherein the membrane is obtained from a film consisting essentially of either:

(i) a copolymer of acrylonitrile and at least one ionic or ionisable olefinically unsaturated monomer, or (ii) a copolymer of acrylonitrile, at least one ionic or ionisable olefinically unsaturated monomer, and at least one non-ionic and non-ionisable olefinically unsaturated monomer, or (iii) a mixture of at least two copolymers as defined under (i) and/or (ii), or (iv) a mixture of at least one copolymer as defined under (i) and/or (ii), and at least one copolymer of acrylonitrile and at least one non-ionic and non-ionisable olefinically unsaturated monomer, the ionic or ionisable monomer units representing from 1 to 80 mole % of the monomer units in one of said copolymers, and representing from 1 to 50 mole % of the monomer units in the membrane.

21. A semi-permeable membrane according to claim 1, which has been prepared by immersion of a film in an aqueous liquid both at a temperature from 80° to 190° C., the film consisting essentially of either:

(i) a copolymer of acrylonitrile and at least one ionic or ionisable monomer, or (ii) a copolymer of acrylonitrile, at least one ionic or ionisable monomer and at least one non-ionic and non-ionisable monomer, or (iii) a mixture of at least two copolymers as defined under (i) and/or (ii), or (iv) a mixture of at least one copolymer as defined under (i) and/or (ii), and at least one copolymer of acrylonitrile and at least one non-ionic and non-ionisable monomer, said copolymer having a specific viscosity (measured at 25° C. in a 2 g/l solution in dimethylformamide) of between 0.5 and 1.5, the ionic or ionisable monomer units representing from 1 to 80% of the monomer units in one of said copolymers and 2 to 15% of the monomer units present in the film, said ionic or ionisable monomer having the formula:

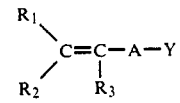

in which:

Y represents an optionally salified sulphonic acid or phosphonic acid group, or a quaternary ammonium group;

each of $R_1$, $R_2$ and $R_3$, which may be identical or different, represents a hydrogen atom or an alkyl radical of 1 to 4 carbon atoms; and A represents:

(a) a divalent purely hydrocarbon group, the free valencies of which are carried by a purely aliphatic saturated or unsaturated, straight or branched chain, or by an aromatic nucleus, or by a mixed chain, one of the free valencies being carried by an aliphatic carbon atom and the other free valency being carried by an aromatic carbon atom, or (b) a divalent chain consisting of aliphatic and/or aromatic hydrocarbon groups, bonded to one another by an oxygen or sulphur atom or by a carbonyloxy or 1-oxo-2-aza-ethylene group, the free valencies being carried by aliphatic and/or aromatic carbon atoms, or (c) a —O—A'— or —S—A'— group. wherein A' represents a group as defined under (a) or (b), or (d) a divalent group as defined under (a), (b) or (c) in which one or more of the carbon atoms are substituted, or (e) a valency bond.

22. A membrane according to claim 21 in which Y represents a sulphonic acid group.

23. A membrane according to claim 22 in which the ionic or ionisable monomer is selected from the group consisting of vinyl sulphonic acid, vinyloxybenzene sulphonic acid and methallyl sulphonic acid and salts thereof and N-methylvinylpyridinium salts.

24. A membrane according to claim 21 in which the film is immersed in glycerine or a mixture of water and glycerine after said immersion of the film in an aqueous liquid bath.

25. Process for preparing a semi-permeable membrane as defined in claim 21 which comprises immersing the film in an aqueous liquid bath at a temperature of 80° to 190° C.

26. Process according to claim 25 in which the ionic or ionisable monomer in said film contains a sulphonic acid group.

27. Process according to claim 1 in which the ionic or ionisable monomer is selected from the group consisting of vinyl sulphonic acid, vinyloxybenzene sulphonic acid and methallylsulphonic acid and salts thereof and N-methylvinylpyridinium salts.

28. Process according to claim 25 in which the film is immersed in glycerine or a mixture of water and glycerine after said immersion of the film in aqueous liquid bath.

29. A semi-permeable membrane according to claim 1, prepared from a film consisting essentially of:
(i) a copolymer of acrylonitrile and at least one ionic or ionisable monomer, or
(ii) a copolymer of acrylonitrile, at least one ionic or ionisable monomer and at least one non-ionic and non-ionisable monomer, or
(iii) a mixture of at least two copolymers as defined under (i) and/or (ii), or
(iv) a mixture of at least one copolymer as defined under (i) and/or (ii), and at least one copolymer of acrylonitrile and at least one non-ionic and non-ionisable monomer, the ionic or ionisable monomer representing 1 to 80% of the monomer units in one of said copolymers and 1 to 50% of the monomer units in the film, said film being subjected to an aqueous thermal treatment by immersion in an aqueous non-solvent bath at 60° to 250° C., the film being monoaxially or biaxially stretched between 20 and 1,000%, measured linearly, during said treatment.

30. A membrane according to claim 29 in which one or more of the acrylonitrilo copolymers has a specific viscosity (measured at 25° C. as a 2 g/l solution in di-methylformamide) between 0.1 and 3 and the temperature of the aqueous bath is between 80° and 190° C.

31. A membrane according to claim 29 in which the acrylonitrile copolymer has a specific viscosity between 0.5 and 1.5.

32. A membrane according to claim 29 in which the film is stretched between 50 and 500% measured linearly.

33. A membrane according to claim 29 in which the ionic or ionisable monomer has the formula:

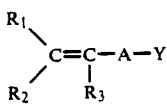

in which:
Y represents an optionally salified sulphonic acid or phosphonic acid group, or a quaternary ammonium group;
each of $R_1$, $R_2$ and $R_3$, which may be identical or different, represents a hydrogen atom or an alkyl radical of 1 to 4 carbon atoms; and
A represents:
(a) a divalent purely hydrocarbon group, the free valencies of which are carried by a purely aliphatic saturated or unsaturated, straight or branched chain, or by an aromatic nucleus, or by a mixed chain, one of the free valencies being carried by an aliphatic carbon atom and the other free valency being carried by an aromatic carbon atom,
or (b) a divalent chain consisting of aliphatic and/or aromatic hydrocarbon groups, bonded to one another by an oxygen or sulphur atom or by a carbonyloxy or 1-oxo-2-aza-ethylene group, the free valencies being carried by aliphatic and/or aromatic carbon atoms,
or (c) a —O—A'— or —S—A'— group, wherein A' represents a group as defined under (a) or (b),
or (d) a divalent group as defined under (a), (b) or (c) in which one or more of the carbon atoms are substituted,
or (e) a valency bond.

34. A membrane according to claim 33 in which Y represents a sulphonic acid group.

35. A membrane according to claim 33 in which the ionic or ionisable monomer is selected from the group consisting of vinyl sulphonic acid, vinyloxybenzene sulphonic acid and methallyl sulphonic acid and salts thereof and N-methylvinylpyridinium salts.

36. A membrane according to claim 29 in which the film is immersed in glycerine or a mixture of water and glycerine after said immersion in aqueous non-solvent bath.

37. Process for preparing a semi-permeable membrane as defined in claim 29 which comprises immersing the film in an aqueous non-solvent bath at a temperature from 60° to 250° C., stretching said film monoaxially or biaxially by 20 to 1,000%, measured linearly, during the immersion.

38. Process according to claim 37 in which the, or at least one of the, acrylonitrile copolymers has a specific viscosity (measured as a 2 g/l solution in dimethylformamide at 25° C.) between 0.1 and 3 and the temperature of the aqueous bath is from 80° to 190° C.

39. Process according to claim 37 in which the, or at least one of the, acrylonitrile copolymers has a specific viscosity between 0.5 and 1.5.

40. Process according to claim 37 in which the film is stretched from 50 to 500%, measured linearly.

41. Process according to claim 37 in which the ionic or ionisable monomer has the formula:

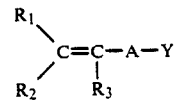

in which:
Y represents an optionally salified sulphonic acid or phosphonic acid group, or a quaternary ammonium group;
each of $R_1$, $R_2$ and $R_3$, which may be identical or different, represents a hydrogen atom or an alkyl radical of 1 to 4 carbon atoms; and
A represents:
(a) a divalent purely hydrocarbon group, the free valencies of which are carried by a purely aliphatic saturated or unsaturated, straight or branched chain, or by an aromatic nucleus, or by a mixed chain, one of the free valencies being carried by an aliphatic carbon atom and the other free valency being carried by an aromatic carbon atom,
or (b) a divalent chain consisting of aliphatic and/or aromatic hydrocarbon groups, bonded to one another by an oxygen or sulphur atom or by a carbonyloxy or 1-oxo-2-axa-ethylene group, the free valencies being carried by aliphatic and/or aromatic carbon atoms,
or (c) a —O—A'— or —S—A'— group, wherein A' represents a group as defined under (a) or (b),
or (d) a divalent group as defined under (a), (b) or (c) in which one or more of the carbon atoms are substituted, or (e) a valency bond.

42. Process according to claim 41 in which Y represents a sulphonic acid group.

43. Process according to claim 42 in which the ionic or ionisable monomer is selected from the group consisting of vinyl sulphonic acid, vinyloxybenzene sulphonic acid and methallylsulphonic acid, and salts thereof, and N-methylvinylpyridinium salts.

44. Process according to claim 37 in which the film is immersed in glycerine or a mixture of water and glycerine after said immersion in the aqueous non-solvent bath.

45. A membrane material according to claim 1 in which the degree of rejection of macromolecules is from 50% to 85% for dextran of an average molecular weight of about 40,000, and is from 28% to 50% for dextran of an average molecular weight of about 10,000, when an aqueous solution comprising 4 g/l of the dextran is subjected to a relative pressure of 2 bars.

46. An apparatus adapted for dialysis and ultrafiltration of blood, comprising membrane material of claim 1.

47. A method of treating human blood to establish a lowered concentration of urea and creatinine in the human blood, which comprises the steps of circulating the human blood in the first compartment of a dialysis cell separated into two compartments by membrane material of claim 1, and circulating a dialysis liquid having the same saline composition at the blood in the other compartment.

48. The membrane according to claim 1 wherein the film is homogenous and symmetrical.

49. The membrane according to claim 1 wherein the membrane has a tensile strength of from 90 to 130 kg/cm$^2$ at 23° C. while wet, and a tensile elongation at break of from 31% to 48%.

* * * * *